(No Model.)
W. ENGLAND.
CHILD'S CARRIAGE.
No. 344,309. Patented June 22, 1886.
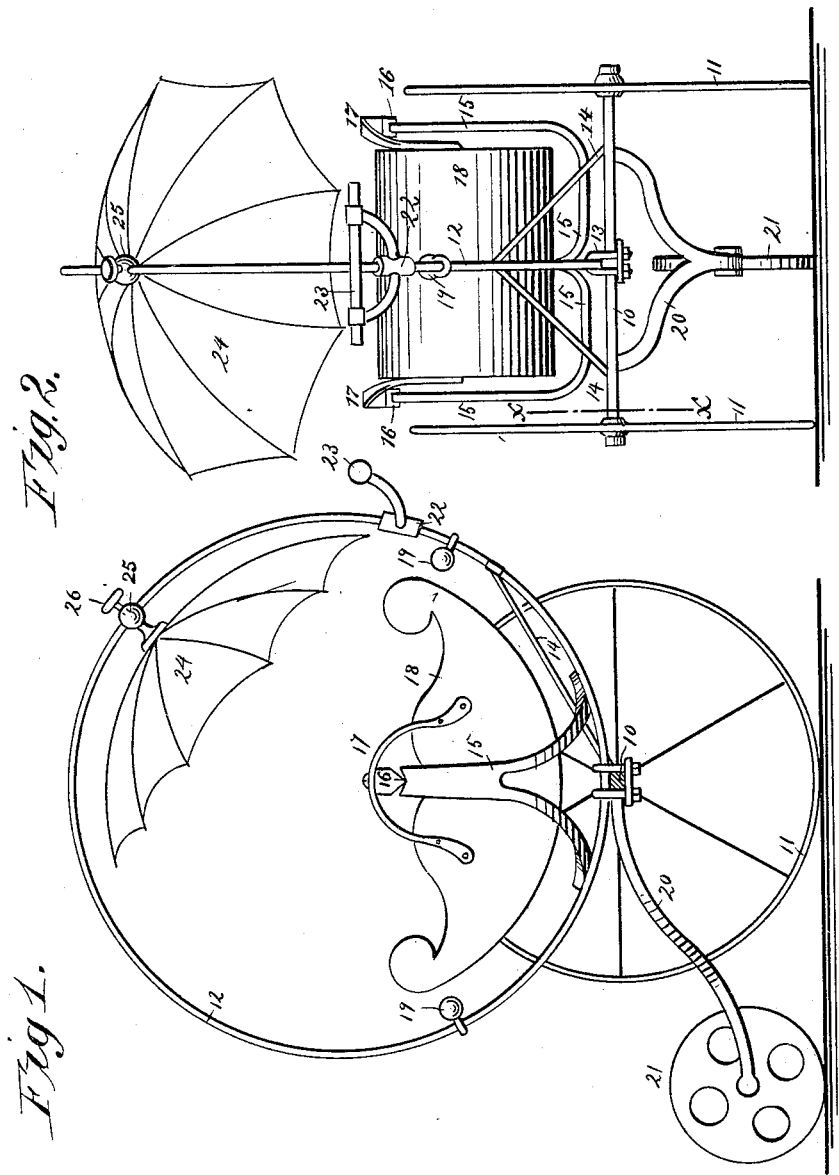
WITNESSES:
J. D. Garfield,
C. Sedgwick.
INVENTOR:
W. England
BY Munn & Co.
ATTORNEYS.

UNITED STATES PATENT OFFICE.

WILLIAM ENGLAND, OF GALVESTON, TEXAS.

CHILD'S CARRIAGE.

SPECIFICATION forming part of Letters Patent No. 344,309, dated June 22, 1886.

Application filed April 19, 1886. Serial No. 199,345. (No model.)

*To all whom it may concern:*

Be it known that I, WILLIAM ENGLAND, of Galveston, in the county of Galveston and State of Texas, have invented a new and Improved Child's Carriage, of which the following is a full, clear, and exact description.

My invention consists in the construction and arrangement of parts, as will be hereinafter fully described and claimed.

Reference is to be had to the accompanying drawings, forming a part of this specification, in which similar figures of reference indicate corresponding parts in both the figures.

Figure 1 is a side view of my improved form of carriage, and Fig. 2 is a rear view of the same.

In constructing such a carriage as is illustrated in the drawings above referred to I provide an axle, 10, to which the wheels 11 are attached in the ordinary manner. To the center of this axle 10, I attach a vertically-arranged hoop, 12, that is secured to the axle by a clip, 13, and, if desired, may be braced by rods, as 14, which extend from the hoop to the axle, being made fast to both of the parts named. Two side standards, 15 15, (the lower ends of which are bifurcated and extend inward,) are rigidly attached to the hoop 12, the main portion of the standards extending upward in parallel lines, as best shown in Fig. 2. The upper end of each of the standards 15 is notched, in order to receive the knife-like edge 16 of the brackets 17, that are fixed to either side of the carriage-body 18, so that when the carriage-body is placed in the position shown best in Fig. 1 it will be supported by and be free to swing upon the upper ends of the standards 15.

Although the carriage-body is free to swing upon the standards 15, its range of motion is defined by rubber or spring buffers 19, that are fixed to the vertical hoop 12. A bracket, 20, is fixed to and extends forward from the axle 10, and to the forward end of this bracket 20 there is rigidly secured a rest, 21, that is preferably arranged in the form of a wheel. To the rear of the vertical hoop 12 there is secured a forked arm, 22, which carries a handle, 23, by which the carriage is propelled. A sunshade, 24, is fixed to the hoop 12 by means of a socket, 25, the arrangement being such that the sunshade may be moved to any position desired above, in front of, or to the rear of the carriage-body, a set-screw, 26, being provided by which the shade may be clamped in any position to which it may be moved.

In moving the carriage the forward stop or imitation wheel is slightly raised from the ground by pressing down upon the handle 23, after which it will be understood the carriage may be moved forward or around in any direction desired. When, however, the carriage is stopped, the fixed wheel 21 is allowed to rest upon the ground, and it will then act as a brake, preventing the carriage from moving forward by its own gravity when stopped upon an incline surface.

Having thus fully described my invention, what I claim as new, and desire to secure by Letters Patent, is—

1. The combination, with the running-gear, of the vertical hoop 12, secured thereto, the brackets 15, extending outward and upward from the hoop, and notched in their upper ends, the body 18, the brackets 17 at opposite sides of the body, and the knife edge projections 16, resting on the upper notched ends of the brackets 15, substantially as set forth.

2. The combination, with the running-gear and body of a child's carriage, of a vertical encircling hoop-carrying buffers, standards 15, and brackets 17, formed with edges 16, which rest upon the standards, substantially as described.

3. In a child's carriage, the combination, with the running-gear consisting of the axle 10 and wheels 11 11, fitted to the axle, of a forwardly-extending bracket carrying a fixed wheel, 21, substantially as described.

4. As an improved article of manufacture, a child's carriage formed with an axle, 10, wheels 11, fitted to the axle, a forwardly-extending bracket, 20, carrying a fixed wheel, 21, a vertical encircling hoop, 12, fixed to the axle, side standards, 15, carriage-body 18, provided with brackets 17, and a sunshade, 24, adjustably connected to the encircling hoop 12, substantially as described.

WILLIAM ENGLAND.

Witnesses:
H. SOUTHGATE,
C. H. BAKER.